United States Patent
Zhang et al.

(10) Patent No.: US 11,448,513 B2
(45) Date of Patent: Sep. 20, 2022

(54) METHODS AND SYSTEMS FOR GENERATING PARALLEL ROAD DATA OF A REGION UTILIZED WHEN PERFORMING NAVIGATIONAL ROUTING FUNCTIONS

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 348 days.

(21) Appl. No.: 16/573,652

(22) Filed: Sep. 17, 2019

(65) Prior Publication Data
US 2021/0080268 A1    Mar. 18, 2021

(51) Int. Cl.
*G01C 21/34* (2006.01)
*G06F 16/23* (2019.01)
*G06F 16/29* (2019.01)
*G01C 21/32* (2006.01)

(52) U.S. Cl.
CPC ......... *G01C 21/3415* (2013.01); *G01C 21/32* (2013.01); *G06F 16/2379* (2019.01); *G06F 16/29* (2019.01)

(58) Field of Classification Search
CPC ............... G01C 21/3415; G01C 21/32; G06F 16/2379; G06F 16/29
See application file for complete search history.

(56) References Cited

U.S. PATENT DOCUMENTS

| | | | |
|---|---|---|---|
| 5,948,042 A * | 9/1999 | Heimann | G08G 1/0104 701/117 |
| 6,560,529 B1 * | 5/2003 | Janssen | G08G 1/096725 340/988 |
| 9,070,293 B2 * | 6/2015 | Roeber | G08G 1/09623 |

(Continued)

FOREIGN PATENT DOCUMENTS

| | | |
|---|---|---|
| JP | 2012185076 A2 | 9/2012 |
| JP | 2015102898 A2 | 6/2015 |
| JP | 2017045193 A2 | 3/2017 |

*Primary Examiner* — Thomas E Worden
(74) *Attorney, Agent, or Firm* — Ditthavong, Steiner & Mlotkowski (57) ABSTRACT

The disclosure provides a method, a system, and a computer program product in accordance with at least one example embodiment for generating parallel road data of a region utilized when performing navigational routing functions. The method comprises obtaining map data of the region including at least one road sign, determining a plurality of first links associated with the at least one road sign based on the map data of the region, determining a relative position of the at least one road sign with respect to each of the plurality of first links, determining one or more second links based on the relative position of the at least one road sign with respect to each of the plurality of first links, generating the parallel road data of the region based on the one or more second links, and updating the map data of the region in a map database based on the generated parallel road data, wherein the updated map data of the region from the map database is utilized when performing navigational routing functions, and wherein the region comprises at least one of the plurality of first links and/or the plurality of second links.

17 Claims, 6 Drawing Sheets

(56) References Cited

U.S. PATENT DOCUMENTS

| | | | |
|---|---|---|---|
| 9,177,212 B2 | 11/2015 | Meis et al. | |
| 9,460,355 B2 | 10/2016 | Stenneth et al. | |
| 9,626,865 B2 | 4/2017 | Yokochi et al. | |
| 9,792,511 B2 * | 10/2017 | Behrens | G06V 10/46 |
| 2016/0275793 A1 * | 9/2016 | Yokochi | G08G 1/09626 |
| 2017/0154229 A1 * | 6/2017 | Yoshitomi | B60Q 9/00 |
| 2020/0018604 A1 * | 1/2020 | Zhang | G06K 9/00818 |

* cited by examiner

| Sign info | Map-matched link info | Left parallel link info | Right parallel link info |
|---|---|---|---|
|  |  |  |  |

METHODS AND SYSTEMS FOR GENERATING PARALLEL ROAD DATA OF A REGION UTILIZED WHEN PERFORMING NAVIGATIONAL ROUTING FUNCTIONS

TECHNOLOGICAL FIELD OF THE INVENTION

The present disclosure generally relates to routing and navigation systems, and more particularly relates to a system, a method, and a computer program product for generating parallel road data of a region.

BACKGROUND

Various navigation applications are available to provide assistance, for example directions for driving, walking, or other modes of travel. Web-based and mobile app-based systems offer navigation applications that allow a user to request directions from one point to another. Often, a route traversed or to be traversed by a user encompasses several links that may extend across different type of roads. For example, a route from a location that is in one part of the city to another location on an opposite end of the city may encompass traversing highways. Such highways may extend over the local roads often merging into a local road. At such intersections and at many other points, the roads may run parallel to each other and traffic flow in each such parallel road may be along the same direction. One or more road signs may be posted alongside or over each of the parallel roads to guide the traffic.

Generally, posted speed signs which are posted on or over a road, are learned using sensor data captured by vehicles. The sensor data comprises images of a road and road surroundings and/or data thereof. Oftentimes due to a wide field-of-view of most of the image sensors, it is highly likely that road signs posted on other roads may also get captured by the onboard sensors. Especially, in the context of parallel roads, sensors onboard a vehicle traveling on a current road may capture road signs posted on the parallel roads, in addition to the road signs for the current road. As such, the vehicle may incorrectly associate the road sign on the parallel road with the current road. Such erroneous data when learnt by the map database may lead to development of an inaccurate map database which may not be suitable for providing reliable navigation assistance.

BRIEF SUMMARY

Accordingly, there is a need for accurately identifying the parallel roads corresponding to a road sign and update the same in a map database. A method, a system, and a computer program product are provided in accordance with an example embodiment described herein for generating parallel road data of a region.

Embodiments of the disclosure provide a system for generating parallel road data of a region. The system comprises a memory configured to store computer executable instructions and one or more processors configured to execute the instructions to obtain map data of the region, the map data comprising data regarding at least one road sign. The one or more processors are further configured to determine a plurality of first links associated with the at least one road sign based on the map data, determine a relative position of the at least one road sign with respect to the plurality of first links, and determine a plurality of second links based on the relative position of the at least one road sign with respect to the plurality of first links. The one or more processors are further configured to generate the parallel road data of the region based on the plurality of second links.

According to some example embodiments, the one or more processors are further configured to update the map data of the region based on the generated parallel road data.

According to some example embodiments, the map data further comprises a first plurality of shape location points. To determine the plurality of first links, the one or more processors are further configured to obtain the second plurality of shape location points from the first plurality of shape location points based on a radial distance threshold value.

According to some example embodiments, to obtain the plurality of first links, the one or more processors are further configured to filter each of the second plurality of shape location points based on a heading criterion. The heading criterion comprises a condition that the heading difference of each of the second plurality of shape location points to the respective at least one road sign is less than a threshold heading value.

According to some example embodiments, to determine the second plurality of links, the one or more processors are further configured to determine an absolute distance between the relative position of the at least one road sign with respect to each of the plurality of first links and the respective one of the plurality of first links and filter each of the plurality of first links based on the absolute distance between the relative position of the at least one road sign and the respective one of the plurality of first links.

According to some example embodiments, to generate the parallel road data of the region, the one or more processors are further configured to determine a map matched location of the at least one road sign and a map matched heading of the at least one road sign, based on the map data. The one or more processors are further configured to determine a refined location of the at least one road sign, based on the map-matched location of the road sign and the map matched heading of the at least one road sign.

According to some example embodiments, to generate the parallel road data of the region, the one or more processors are further configured to determine a map matched location of each of the plurality of second links and determine a judgement value for a side of each of the plurality of second links with respect to the at least one road sign, based on the map-matched location of a respective one of the plurality of second links and the refined location of the at least one road sign.

According to some example embodiments, the one or more processors are further configured to determine the side of each of the one or more second links with respect to the at least one road sign, based on the judgement value. The one or more processors are further configured to generate the parallel road data of the region based on the determined side of each of the one or more second links with respect to the at least one road sign.

Embodiments of the disclosure provide a method for generating parallel road data of a region. The method comprises obtaining map data of the region, wherein the map data comprises the at least one road sign, determining a plurality of first links associated with the at least one road sign, based on the map data of the region. The method further comprises determining a relative position of the at least one road sign with respect to the plurality of first links, determining one or more second links, based on the relative position of the at least one road sign with respect to the plurality of first links and generating the parallel road data of the region, based on the one or more second links.

Embodiments of the disclosure provide a computer programmable product for generating parallel road data of a region. The computer programmable product comprises a non-transitory computer readable medium having stored thereon computer executable instruction which when executed by one or more processors, cause the one or more processors to carry out operations for generating the parallel road data of the region, the operations comprising obtaining map data of the region, the map data comprising at least one road sign. The operations further comprise determining a plurality of first links associated with the at least one road sign, based on the map data of the region. The operations further comprise determining a relative position of the at least one road sign with respect to the plurality of first links, determining one or more second links, based on the relative position of the at least one road sign with respect to the plurality of first links, and generating the parallel road data of the region, based on the one or more second links.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION OF THE INVENTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "road" may refer to a way leading an autonomous vehicle from one place to another place. The road may have a single lane or multiple lanes.

The term "link" may refer to any connecting pathway including but not limited to a roadway, a highway, a freeway, an expressway, a lane, a street path, a road, an alley, a controlled access roadway, a free access roadway and the like.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

The term "upstream heading" may refer to the heading of the start location of the link, measured as the heading of the vector formed by the link start node and its nearest shape location.

The term "road sign" may refer to signs positioned at the side of or above roads to provide information to road users. The road signs may include speed limit sign, street name sign, school sign, 'men at work' sign, a yellow lane marking, an underpass sign, an overpass sign, a road marking, or a lane marking etc.

The term "shape location points" may refer to the points where the shape of the link changes.

End of Definitions

Embodiments of the present disclosure may provide a system, a method and a computer program product for generating parallel road data of a region to provide reliable navigation assistance to vehicles. In one or more example embodiments, the generated data may be used for navigating a vehicle. The solutions provided herein may provide accurate identification of locations of parallel roads near a road sign, for autonomous, semi-autonomous vehicles and manually driven vehicles to avoid problems related to parallel roads. These and other technical improvements of the invention will become evident from the description provided herein.

The system, the method, and the computer program product facilitating generation of parallel road data of a region are described with reference to FIG. 1 to FIG. 6.

Figure 1:
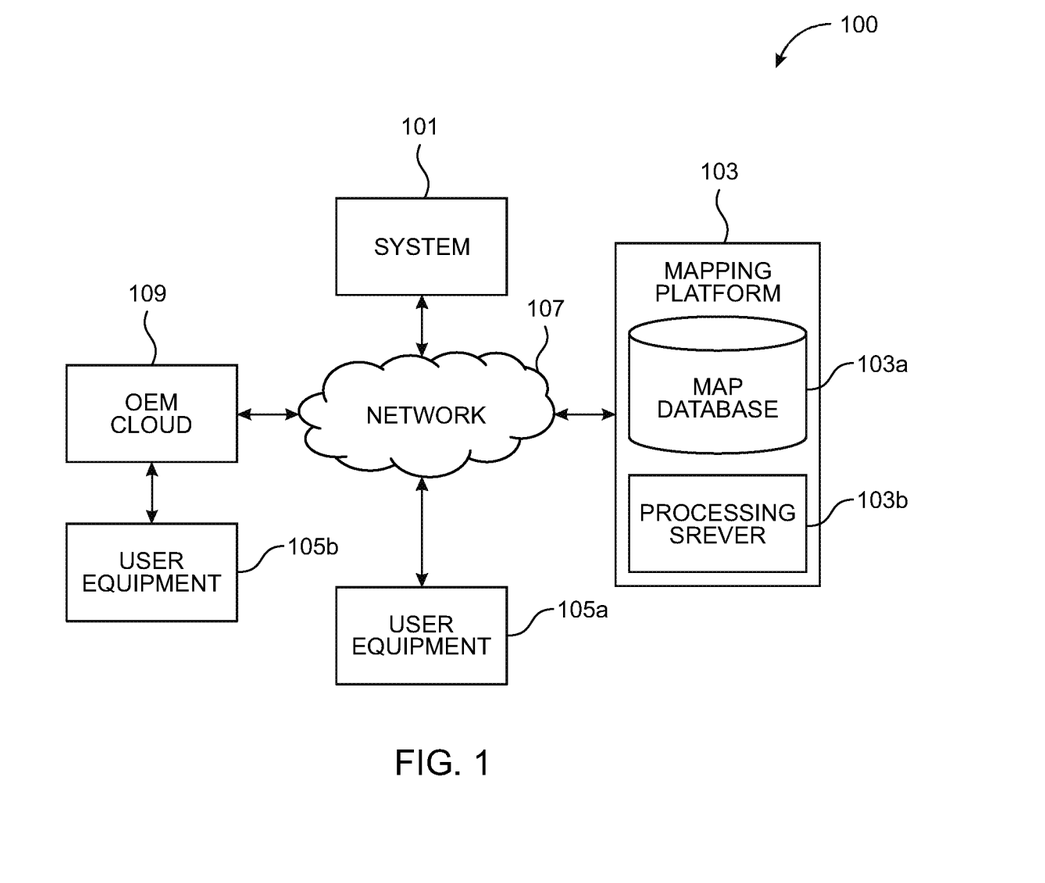
FIG. 1 illustrates a schematic diagram of a network environment of a system for generating parallel road data of a region, in accordance with an example embodiment.

FIG. 1 illustrates a schematic diagram of a network environment 100 of a system 101 for generating parallel road data of a region, in accordance with an example embodiment. The system 101 may be communicatively coupled to a mapping platform 103, a user equipment 105*a* and an OEM (Original Equipment Manufacturer) cloud 109 connected to a user equipment 105*b*, via a network 107. The components described in the network environment 100 may be further broken down into more than one component and/or combined together in any suitable arrangement. Further, it is possible that one or more components may be rearranged, changed, added, and/or removed.

In an example embodiment, the system 101 may be embodied in one or more of several ways as per the required implementation. For example, the system 101 may be embodied as a cloud based service or a cloud based platform. As such, the system 101 may be configured to operate outside the user equipment 105*a* and/or 105*b*. However, in some example embodiments, the system 101 may be embodied within one or both of user equipment 105*a* and 105*b*, for example as part of an in-vehicle navigation system. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to generate the parallel road data of a region. Further, in one embodiment, the system 101 may be a standalone unit configured to generate parallel road data of a region near a road sign for the autonomous vehicle. Alternatively, the system 101 may be coupled with an external device such as the autonomous vehicle.

The mapping platform 103 may comprise a map database 103*a* for storing map data and a processing server 103*b*. The map database 103*a* may store node data, road segment data, link data, point of interest (POI) data, link identification information, heading value records or the like. The map database 103*a* may also store cartographic data, routing data, and/or maneuvering data. Also, the map database 103*a* further includes speed limit data of each lane, cartographic data, routing data, and/or maneuvering data. Additionally, the map database 103*a* may be updated dynamically to cumulate real time traffic conditions. The real time traffic conditions may be collected by analyzing the location transmitted to the mapping platform 103 by a large number of road users through the respective user devices of the road users. In one example, by calculating the speed of the road users along a length of road, the mapping platform 103 may generate a live traffic map, which is stored in the map database 103*a* in the form of real time traffic conditions. The real time traffic conditions update the autonomous vehicle on slow moving traffic, lane blockages, under construction road, freeway, right of way, and the like. In one embodiment, the map database 103*a* may further store historical traffic data that includes travel times, average speeds and probe counts on each road or area at any given time of the day and any day of the year. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 103*a* may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103*a* may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a may include event data (e.g., traffic incidents, construction activities, scheduled events, unscheduled events, accidents, diversions etc.) associated with the POI data records or other records of the map database 103a associated with the mapping platform 103. Optionally, the map database 103a may contain path segment and node data records or other data that may represent pedestrian paths or areas in addition to or instead of the autonomous vehicle road record data.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 105a and/or 105b. The navigation-related functions may correspond to vehicle navigation, pedestrian navigation or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 105a and/or 105b to provide navigation and/or map-related functions. For example, the map database 103a may be used with the user equipment 105a and/or 105b to provide an end user with navigation features. In such a case, the map database 103a may be downloaded or stored locally (cached) on the user equipment 105.

The processing server 103b may comprise processing means and communication means. For example, the processing means may comprise one or more processors configured to process requests received from the user equipment 105a, 105b. The processing means may fetch map data from the map database 103a and transmit the same to the user equipment 105 via OEM cloud 109 in a format suitable for use by the one or both of the user equipment 105a and/or 105b. In one or more example embodiments, the mapping platform 103 may periodically communicate with the user equipment 105a, 105b via the processing server 103b to update a local cache of the map data stored on the user equipment 105a, 105b. Accordingly, in some example embodiments, the map data may also be stored on the user equipment 105a, 105b and may be updated based on periodic communication with the mapping platform 103.

In some example embodiments, the user equipment 105a, 105b may be any user accessible device such as a mobile phone, a smartphone, a portable computer, and the like that is portable in itself or as a part of another portable/mobile object such as a vehicle. The user equipment 105a, 105b may comprise a processor, a memory and a communication interface. The processor, the memory and the communication interface may be communicatively coupled to each other. In some example embodiments, the user equipment 105a, 105b may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 105a, 105b may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105a, 105b. Additional, different, or fewer components may be provided. For example, the user equipment 105a, 105b may be configured to execute and run mobile applications such as a messaging application, a browser application, a navigation application, and the like. At least one user equipment such as user equipment 105b may be directly coupled to the system 101 via the network 107. For example, the user equipment 105b may be a dedicated vehicle (or a part thereof) for gathering data for development of the map data in the database 103a. In some example embodiments, at least one user equipment such as the user equipment 105b may be coupled to the system 101 via the OEM cloud 109 and the network 107. For example, the user equipment 105b may be a consumer vehicle (or a part thereof) and may be a beneficiary of the services provided by the system 101. In some example embodiments, one or more of the user equipment 105a and 105b may serve the dual purpose of a data gatherer and a beneficiary device. The user equipment 105a or 105b may be configured to capture sensor data associated with a road which the user equipment 105a, 105b may be traversing. The sensor data may for example be image data of road objects, road signs, or the surroundings (for example buildings). The sensor data may refer to sensor data collected from a sensor unit in the user equipment 105a and/or user equipment 105b. In accordance with an embodiment, the sensor data may refer to the data captured by the vehicle using sensors.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 107 is coupled directly or indirectly to the user equipment 105b via OEM cloud 109. In an example embodiment, the system may be integrated in the user equipment 105b. In an example, the mapping platform 103 may be integrated into a single platform to provide a suite of mapping and navigation related applications for OEM devices, such as the user devices and system 101. The system 101 may be configured to interface with the mapping platform 103 over the network 107. Thus, the mapping platform 103 may enable provision of cloud-based services for the system 101, such as, storing the lane marking observations in the OEM cloud in batches or in real-time.

Figure 2:
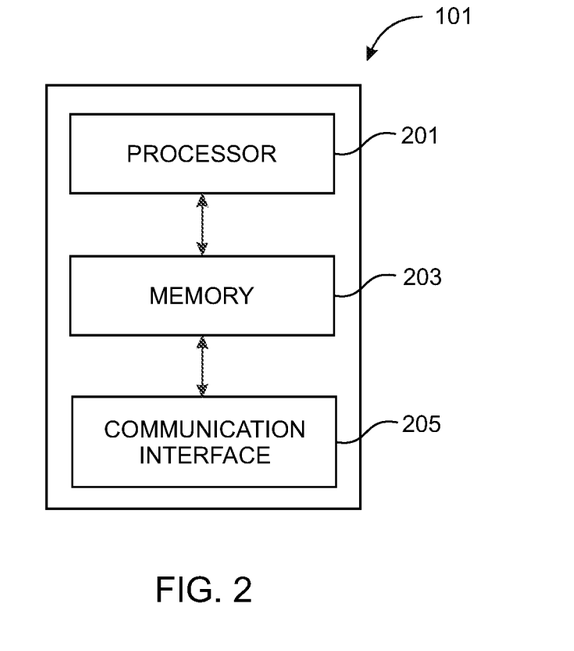
FIG. 2 illustrates a block diagram of the system, exemplarily illustrated in FIG. 1, for generating parallel road data of a region, in accordance with an example embodiment.

FIG. 2 illustrates a block diagram of the system 101 for generating parallel road data of a region, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101, where the users may be a traveler, a rider, a pedestrian, and the like. In some embodiments, users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101.

Additionally or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the user equipment 105a, 105b or any other component with which the system 101 may communicate. The communication interface 205 may be any means such as a device or circuitry embodied in either hardware or a combination of hardware and software that is configured to receive and/or transmit data to/from a communications device in communication with the user equipment 105a, 105b. In this regard, the communication interface 205 may include, for example, an antenna (or multiple antennae) and supporting hardware and/or software for enabling communications with a wireless communication network. Additionally or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

Figure 3A:
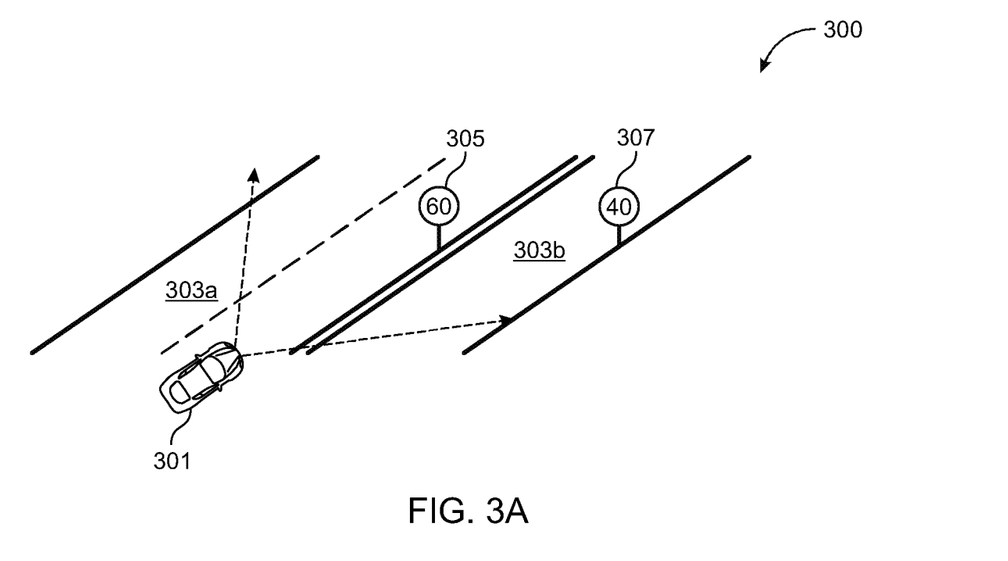
FIG. 3A illustrates an exemplary scenario of a working example of the system, exemplarily illustrated in FIG. 1, for generating parallel road data of a region, in accordance with an example embodiment.

FIG. 3A illustrates an exemplary scenario 300 of a working example of the system 101, for generating parallel road data of a region, in accordance with an example embodiment. A vehicle 301 (such as the user equipment 105a or 105b illustrated in FIG. 1) may be travelling on a main link 303a on which a road sign 305 may be posted. Another road sign 307 may be associated with a mirror link 303b. The main link 303a and the mirror link 303b may be parallel to each other and therefore may be referred to as parallel roads. In some example embodiments, the road sign 305 and 307 may correspond to speed signs and may have an indicated speed of 60 KMPH and 40 KMPH, respectively.

The vehicle 301 travelling on main link 303a may capture the road signs 305 and 307 falling within a field of view of onboard sensors of the vehicle 301. The vehicle 301 may process the captured road signs 305 and 307 and report them as being posted on the link which the vehicle 301 may be traversing (in this case 303a). However, since the road sign 307 is associated with the mirror link 303b, the vehicle 301 may report erroneous map data regarding the sign observation for road sign 307. This problem is referred to as parallel road problem. When such erroneous sign observation is learnt and is used to build/update a map database (such as the map database 103a of mapping platform 103) the map database cannot be regarded as reliable and users of such map database may be provided with improper navigation assistance. Alternately, if the erroneous observation is utilized locally by the vehicle 301 for performing navigation functions, the vehicle 301 may not be able to correctly comprehend the sign observations which can lead to undesired situations such as accidents.

In some example embodiments, the system 101 may provide measures for rectifying the aforesaid parallel road problem. For example, when the sign observation is reported at the mapping platform 103 for learning purposes, the mapping platform 103 may trigger and invoke the system 101 to generate parallel road data for the road sign observation. Alternately, the system 101 may be invoked on demand or routinely to generate parallel road data for signs that have already been learnt and thereby update the map data of signs for which the parallel road problem exists. In some example embodiments, the system 101 may be invoked when an end user equipment (such as the user equipment 103a or 103b) may request a route between two locations. The mapping platform 103 may determine the links encompassed by the route and their corresponding road signs and thereafter invoke the system 101 to generate parallel road data of each road sign associated with the route. In this way, the mapping platform 103 and/or the end user equipment may be informed of the links for which parallel roads exist. Accordingly, the mapping platform 103 and/or the user equipment may apply correction techniques to address the parallel road problem. Irrespective of the manner in which the system 101 is triggered, the system 101 may provide measures for generating parallel road data of road signs 305 and/or 307.

Referring to FIG. 3A, in an example embodiment, the vehicle 301 may capture road signs 305 and 307 and report to the mapping platform 103 as being associated with the main link 303a. In response, the mapping platform 103 may invoke the system 101 to generate parallel road data for the road signs 305 and 307 for rectifying the parallel road problem. Hereinafter description regarding working of the system 101 is provided with reference to the road sign 305, however, it may be contemplated that within the scope of this disclosure, processing for road sign 307 may occur in a similar manner.

On being triggered, the system 101 may obtain map data of a region with which the reported road sign 305 is associated. The region may be defined as enclosed within a threshold radius from the location of the reported road sign 305. The threshold radius may be a configurable value that is based on one or more factors such as the geographic area zone in which the road sign 305 is posted, a functional class of the road associated with the road sign 305, and time of day at which the road sign 305 is reported. The threshold value is defined such that sufficient map data of the region is available for further processing. For example, in an urban area, substantial map data may be available for even a small region whereas in outskirt areas and rural areas, it may be required that the region is of larger radius so as to have a substantial and predefined amount of map data in the region. In some example embodiments, the threshold value may be 300 meters; however any suitable value be selected. The system 101 may obtain the map data of the region from a data source such as the map database 103a. The map data of the region may comprise for example, map data of the links in the region associated with the road sign 305, shape point locations associated with those links, and map data of road signs associated with those links. The map data of the road signs, for example the road sign 305, may comprise one or more of a sign value, geo-location of the road sign, map matched location of the road sign, map-matched link of the road sign, heading information of the road sign, a link start node of the map-matched link, a link end node of the map-matched link, and the like.

Each link in the map data may have a link start location (also referred to as start node or link start node) and a link end location (also referred to as end node or link end node). The link start location of a link may refer to the point from where the link originates and the link end location of the link may refer to the point where the link terminates. Each link may also have one or more shape point locations. A shape point location may refer to a point where the shape of the link changes. In an example embodiment, the shape point locations of a link may be used along with the start node for determining the heading of a link, a detailed description of which is provided next with reference to FIG. 3B. Hereinafter, the shape point locations, the link start nodes, and the link end nodes of the links associated with the road sign 305 may be interchangeably referred to as link points.

Figure 3B:
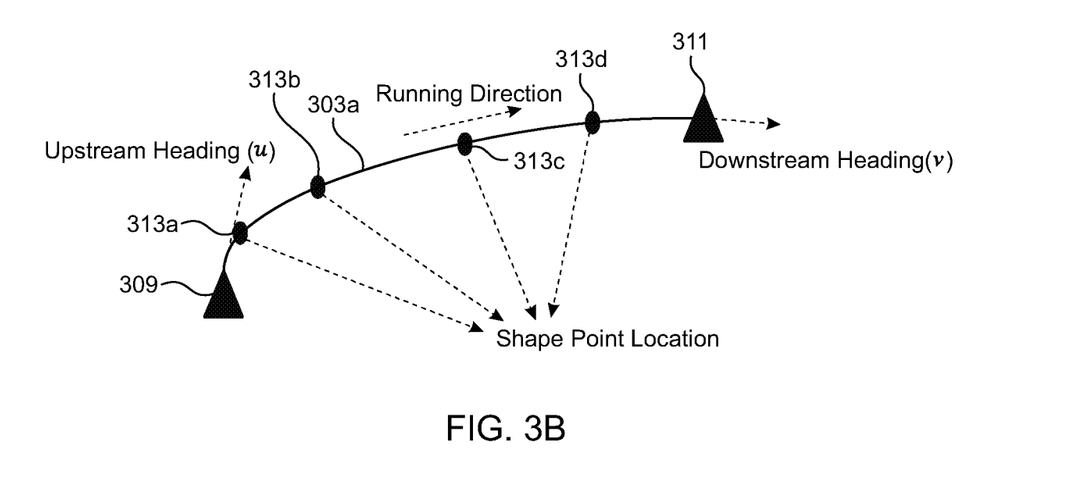
FIG. 3B illustrates a schematic diagram showing shape point locations of a main link, for generating parallel road data of a region, in accordance with an example embodiment.

FIG. 3B illustrates a schematic diagram showing shape point locations of the main link 303a, in accordance with an example embodiment. FIG. 3B is described in conjunction with FIG. 3A. One or more link attributes of the link 303a may be used for determining heading of the link 303a, in accordance with an example embodiment. The link 303a may start from a start node 309 and terminate at an end node 311. Further, the link 303a may have corresponding shape point locations 313a, 313b, 313c, and 313d. The upstream heading (u) of the link 303a may be defined as the heading of the start node 309 of the link 303a, measured as the heading of the vector formed by the start node 309 and the nearest shape point location i.e. 313a. Similarly, the downstream heading (v) may be defined as the heading of the end node 311 of the link 303a, measured as the heading of the vector formed by the nearest shape point location of the end node 311 (i.e. in this case 313d) and the end node 311.

For any arbitrary shape point location $s_i$ the coordinates in a two dimensional plane may be defined as:

$$x = \text{lon}(s\_i) - \text{lon}(s\_(i+1))$$

$$y = \text{lat}(s\_i) - \text{lat}(s\_(i+1))$$

where lon(s_i) and lat(s_i) correspond to the longitude and latitude of the shape location, while lon(s_(i+1)) and lat(s_(i+1)) correspond to that of the next shape location in the driving direction of the link. The heading of the arbitrary shape point location $s_i$ may be defined as:

$$\text{heading}(s\_i) = \{\blacksquare(\arccos(y/\sqrt{(x^2 + y^2)}) \text{ if } x \geq 0 @ 360 - \arccos(y/\sqrt{(x^2 + y^2)}) \text{ if } x < 0) \dashv$$

In case, the shape point location $s_i$ is the last shape point location of the link, then the link end node may be considered as the next shape point location. For example, in the scenario illustrated in FIG. 3B, if the shape point location $s_i$ is 313d, the next shape point location may be considered as the link end node 311. For the link start node of a link, the heading may be calculated considering the link start node as $s_i$ and the next shape point location as $s_{i+1}$ which in this case is 313a. The driving direction of a link is an important factor based on which the sequence of shape point locations is defined. Accordingly, the driving direction should be considered when calculating the heading of each shape location point and node of the link.

Referring back to FIG. 3A, in some example embodiments, after obtaining the shape point locations, the link start node, and link end node of the links (also referred to as link points) in the region, the system 101 may extract their heading value using the equation defined above. The system 101 may also obtain the heading information of the road sign 305 and thereafter determine a heading difference of each one of the link points in the region, with respect to the road sign 305. That is a difference between the heading of a link point and the heading of the road sign 305 may be computed. The system 101 may then filter out the link points whose heading difference with respect to the road sign 305 is smaller than a heading threshold value. This condition may be referred to as a heading criterion. The threshold heading value in the heading criterion may for example be 20 degrees. The threshold heading value may be a configurable value that is based on several factors such as the road type, road curvature etc.

The system 101 may thus obtain one or more heading filtered link points using the heading criterion. The system 101 may extract the links corresponding to each of the heading filtered link points from the mapping platform 103. The system 101 may then determine a relative position of the road sign 305 relative to each of the extracted links of the heading filtered link points (hereinafter, also referred to as heading filtered links) to determine potential candidates for the parallel links, a detailed description of which is provided next with reference to FIGS. 4A-4C.

Figure 4A:
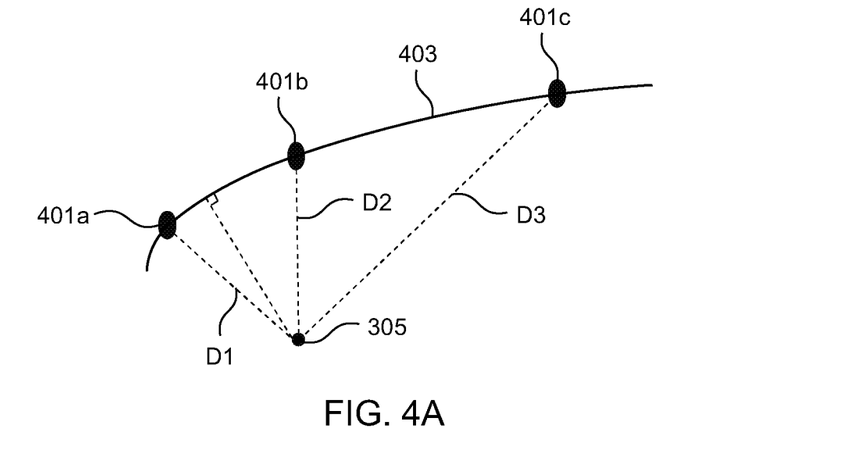
FIGS. 4A-4C illustrate exemplary scenarios for calculating a relative position of a road sign with respect to one or more links in the region, in accordance with an example embodiment.
Figure 4B:
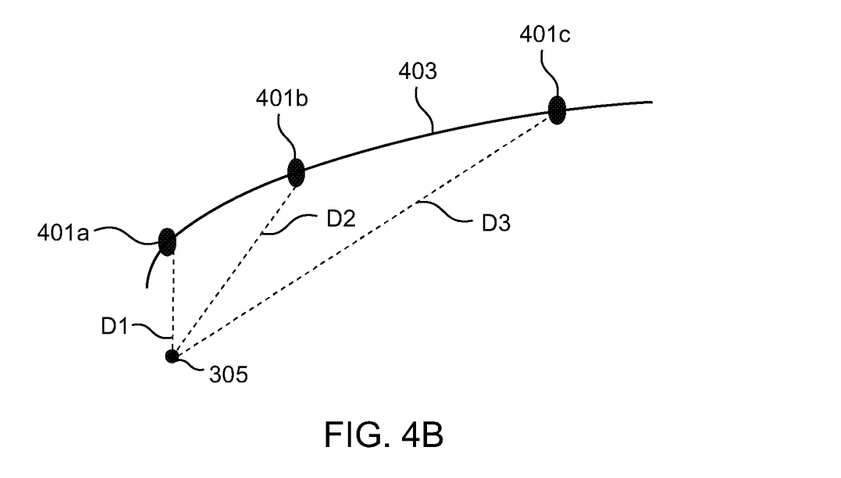
Figure 4C:
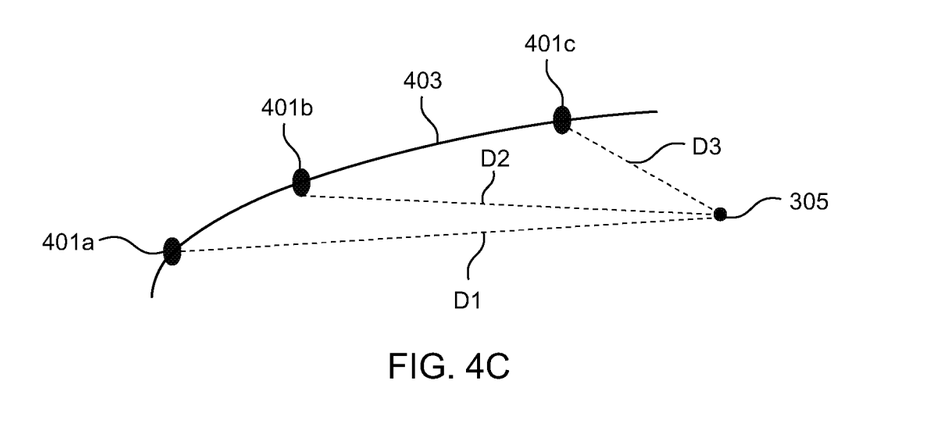

FIGS. 4A-4C illustrate exemplary scenarios for calculating a relative position of the road sign 305 with respect to each of the heading filtered links, in accordance with an example embodiment. Shape location points 401a, 401b, and 401c may correspond to a link 403 which may be extracted as one of the heading filtered links for a road sign 305. To determine the relative position of the road sign 305 to the link 403, the system 101 first determines the relative position of the sign 305 to all pairs of shape point locations (i.e. 401a, 401b, and 401c) in that link. If the sign 305 is "right above" on a segment between at least a consecutive pair of shape point locations, it may be considered that the sign 305 is "right above" the link 403. This scenario is illustrated in FIG. 4A.

The system 101 calculates a distance between the road sign 305 and each of the shape point locations 401a, 401b, and 401c to determine a candidate shape point location as the shape point location whose distance from the road sign 305 is minimum. As can be seen in FIG. 4A, D1, D2, and D3 are the distances between the road sign 305 and the shape point locations 401a, 401b, and 401c, respectively. Since D1 is minimum among D1, D2, and D3, shape point location 401a is selected by the system 101 as the candidate shape point location. The system 101 may then determine shape point locations that are consecutive with respect to the candidate shape point location. In the exemplary scenario illustrated in FIG. 4A, only shape point location 401b is consecutive with respect to the candidate shape point location 401a since there is no preceding shape point location for 401a. The system 101 may determine the relative position of the road sign 305 with respect to each pair of consecutive shape point locations. If the relative position is 'right above' i.e. the road sign is orthogonal with respect to the segment between the consecutive pair of shape point locations, it may be considered that the road sign 305 is right above such a link. For example, in the exemplary scenario illustrated in FIG. 4A, the road sign 305 is orthogonal with respect to the segment between the shape point location pair of 401a and 401b. Therefore, the system 101 selects the link 403 as the candidate link for further processing.

However, if the road sign 305 is on the side of the segment between the consecutive pair of shape point locations, then the link 403 may not qualify as a candidate link for further processing. For example, in the scenario illustrated in FIG. 4B distance D1 is minimum among D1, D2, and D3. Therefore, 401a is selected as the candidate shape point location which has 401b as the consecutive shape point location. However, the rod sign 305 is not orthogonal with respect to the segment between the pair of 401a and 401b. Similarly, as illustrated in FIG. 4C, distance D3 is minimum among D1, D2, and D3, so 401c qualifies as the candidate shape point location which has 401b as the consecutive shape point location. However, the road sign 305 is not orthogonal with respect to the segment between the pair of 401b and 401c. In such cases, it may be regarded that the road sign 305 is 'on the side' of the link 403. Accordingly, in such cases, link 403 does not qualify as a candidate link for further processing by the system 101.

After determining the candidate links based on the relative position check, the system 101 filters the candidate links according to their orthogonal distance from the road sign 305. A distance threshold may be utilized for this purpose. The distance threshold may be a configurable value that is based on several factors such as road type, geographic region in which the road sign is posted. In some example embodiments, the distance threshold may have a value of 30 meters. The system 101 may thus filter the candidate links based on the distance threshold to obtain distance filtered candidate links.

The distance filtered candidate links extracted above may also include the map-matched link 303a of the road sign 305. However, the map-matched link 303a is not a parallel link for the road sign 305. Therefore, the system 101 may perform a check for the map-matched link 303a in the set of distance filtered candidate links and remove the map-matched link 303a from the set, if it exists in the set of distance filtered candidate links. Using this corrected set of distance filtered candidate links, the system 101 may perform parallel road identification for the road sign 305.

Figure 5A:
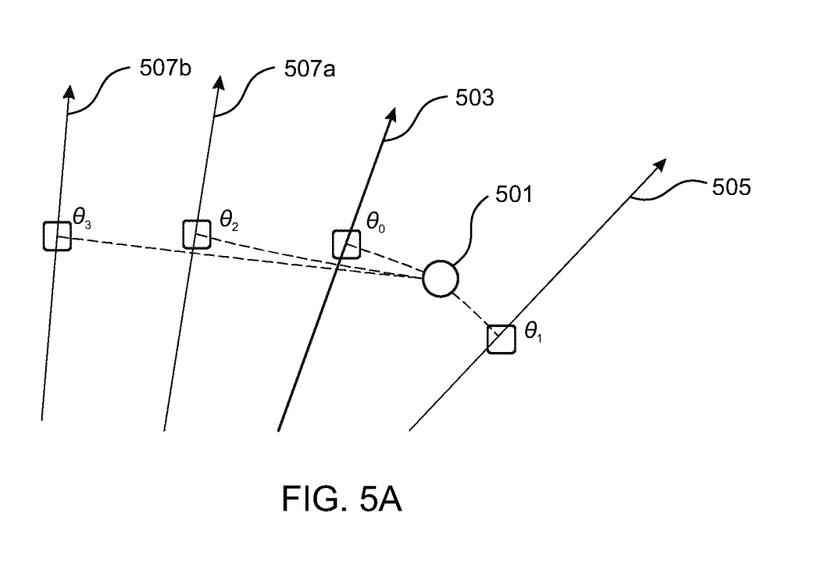
FIG. 5A illustrates an exemplary scenario depicting parallel road identification for a road sign, in accordance with an example embodiment.

FIG. 5A illustrates an exemplary scenario depicting parallel road identification for a road sign 501, in accordance with an example embodiment. The road sign 501 has a map-matched location $\theta_0$ and a map-matched link 503. A right link 505 may exist on the right of the map-matched link 503 while two left links 507a and 507b may exist on the left of the map-matched link 503. The links 505, 507a, and 507b may be obtained as the corrected set of distance filtered candidate links for the road sign 501. The system 101 may next determine the side of each link of the corrected set of distance filtered candidate links with respect to the map-matched link 503 of the road sign 501. To this end, the system 101 may determine a judgement value denoted as 'Judge' for each link of the corrected set of distance filtered candidate links (i.e. links 505, 507a, and 507b). The judgement value may indicate a side of the distance filtered candidate link with respect to the map-matched link 503.

The system 101 determines the map-matched location ($\theta_i$) of each link of the corrected set of distance filtered candidate links. In the exemplary scenario illustrated in FIG. 5A, the map-matched locations of the distance filtered candidate links 505, 507a, and 507b are indicated as $\theta_1$, $\theta_2$, and $\theta_3$ respectively. Next the system 101 computes a new map matched location ($\theta_0^*$) of the map-matched link 503 along the driving direction of the map-matched link 503. The new location $\theta_0^*$ may be computed as:

$$\text{lon}(\theta\_0\hat{\,}^*) = \text{lon}(\theta\_0) + \sin(\eta\_0) \cdot 0.001$$

$$\text{lat}(\theta\_0\hat{\,}^*) = \text{lat}(\theta\_0) + \cos(\eta\_0) \cdot 0.001$$

where:
$\text{lon}(\theta_0^*)$ is the longitudinal coordinate of the new map-matched location $\theta_0^*$;
$\text{lat}(\theta_0^*)$ is the latitudinal coordinate of the new map-matched location $\theta_0^*$;
$\text{lon}(\theta_0)$ is the longitudinal coordinate of the new map-matched location $\theta_0$;
$\text{lat}(\theta_0)$ is the latitudinal coordinate of the new map-matched location $\theta_0$;
$\eta_0$ is the map-matched heading of the road sign 501.

The system 101 then determines the judgement value Judge of the map-matched location ($\theta_i$) of each of the distance filtered candidate links as:

$$\text{Judge} = (\text{lon}(\theta_0^*) - \text{lon}(\theta_0)) \cdot (\text{lat}(\theta_i) - \text{lat}(\theta_0)) - (\text{lat}(\theta_o^*) - \text{lat}(\theta_0)) \cdot (\text{lon}(\theta_i) - \text{lon}(\theta_0))$$

If the judgement value of $\theta_i$ is less than zero then the corresponding link of $\theta_i$ is on the right side of the map-matched link 503 whereas if the judgement value of $\theta_i$ is greater than zero then the corresponding link of $\theta_i$ is on the left side of the map-matched link 503.

In some example embodiments, more than one link may have a corresponding judgement value of less than or more than zero. Such cases may require additional processing to determine if the situation matches with the road condition. For this, the system 101 may check which links among the qualified links are within a threshold distance from the map-matched location $\theta_0$. The threshold distance may be chosen based on one or more factors such as a road classifier of the map-matched link 503. For example, in most of the countries roads may be classified into various function classes, each designating a specific type of road. In an embodiment, the road classifiers may be defined as functional class in few areas and may be designated by a value ranging from 1 to 5, where number 1 is assigned to a freeway, highway or an expressway and number 5 to other type of roads such as rural roads.

If only one link is within the threshold distance, it may be selected as the corresponding parallel link (left or right) for the road sign 501. However, in some example embodiments, if more than one link is within the threshold distance, then the system 101 may determine the road classifier of the map-matched link 503. If the road classifier indicates that the map-matched link corresponds to a highway or a speedway, all such links that are within the threshold distance may be indicated as the corresponding parallel link. However, if the road classifier of the map-matched link 503 indicates that the map-matched link corresponds to a local or rural road, it is highly unlikely that such a local road will have multiple parallel roads on one side. Accordingly, the system 101 may select the link that is closest to the map-matched link (i.e. shortest orthogonal distance on respective side of the map-matched link 503) as the corresponding parallel link.

In the exemplary scenario illustrated in FIG. 5A, the system 101 may determine that the judgement value for link 505 is less than zero while that of links 507a and 507b is more than zero. Since, on the right side of the map-matched link 503, only one link (i.e. link 505) is found, the system 101 may designate it as the right parallel link. However, since two links (i.e. 507a and 507b) are found on the left side of the map-matched link 503, the system 101 may determine which among them is within a threshold distance. For this, the system may determine the threshold distance based on, for example, the road classifier of the map-matched link 503. If the road classifier of the map-matched link 503 indicates that it is a highway, then the threshold distance may be considered to be large such as 60 meters. In other cases, the threshold distance may be selected as a smaller value such as 10 meters. If only the link 507a (since it is closer to the map-matched link 503) falls within the threshold distance, it may be selected as the left parallel link for the road sign 501. However, if both 507a and 507b are within the threshold distance, then the system 101 may check for the road classifier of the map-matched link 503. If the road classifier indicates a highway, then both the links 507a and 507b may be selected as the left parallel links. Alternately, if the road classifier indicates a local road or rural road, then the closest (with respect to the map-matched link 503) among the links 507a and 507b (in this case 507a) may be selected as the left parallel link.

Alternately, in some example embodiments, in case more than one link have a corresponding judgement value of less than or more than zero, the system 101 may determine the link that is closest to the map-matched location $\theta_0$ as the corresponding parallel link (left or right) for the road sign 501, irrespective of the road classifier of the map-matched link 503. For example, in the exemplary scenario illustrated in FIG. 5A, the system 101 may determine that the judgement value for link 505 is less than zero while that of links 507a and 507b is more than zero. Since, on the right side of the map-matched link 503, only one link (i.e. link 505) is found, the system 101 may designate it as the right parallel link. However, since two links (i.e. 507a and 507b) are found on the left side of the map-matched link 503, the system 101 may determine which among them is closest to the map-matched location $\theta_0$. The link on a particular side (left or right) that is closest to the road sign 501 may be selected as the corresponding (left or right) parallel link.

In this way, the system 101 may determine one or both of the left parallel link data and right parallel link data of the road sign 501. The system 101 may generate this in a data format suitable for storing information of the road sign 501 and the parallel link data. One such example data format is illustrated in FIG. 5B.

Figure 5B:
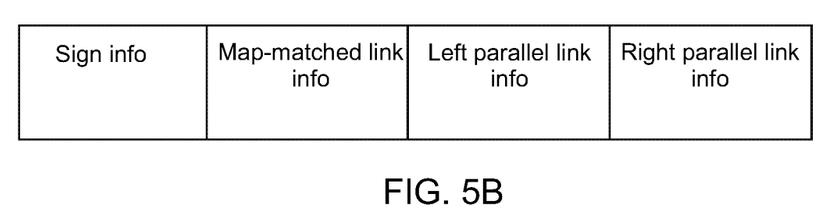
FIG. 5B illustrates a data format for storing information of the road sign and the parallel links, in accordance with an example embodiment.

FIG. 5B illustrates a data format for storing parallel road data of a road sign. The data format may be a tabular format storing specific entries of each road sign in a separate column. For example, the data format illustrated in FIG. 5B contains the information of the road sign as an entry in the "Sign info" column. The information of the corresponding map matched link is stored as an entry in the "Map-matched link info" column. The corresponding left and/or right parallel link information is stores in the "Left parallel link info" and "Right parallel link info" columns respectively. The parallel road data thus generated in the data format illustrated herein may be transmitted to a data source such as the mapping platform 103 of FIG. 1 for storage or update. In this way, the system 101 may identify all the parallel links for road signs in a region and indicate the same to the mapping platform 103 for suitable end use cases. For road signs that do not have any parallel road, the corresponding entries under the "Left parallel link info" and "Right parallel link info" columns in the tabular data format illustrated in FIG. 5B are blank.

Figure 6:
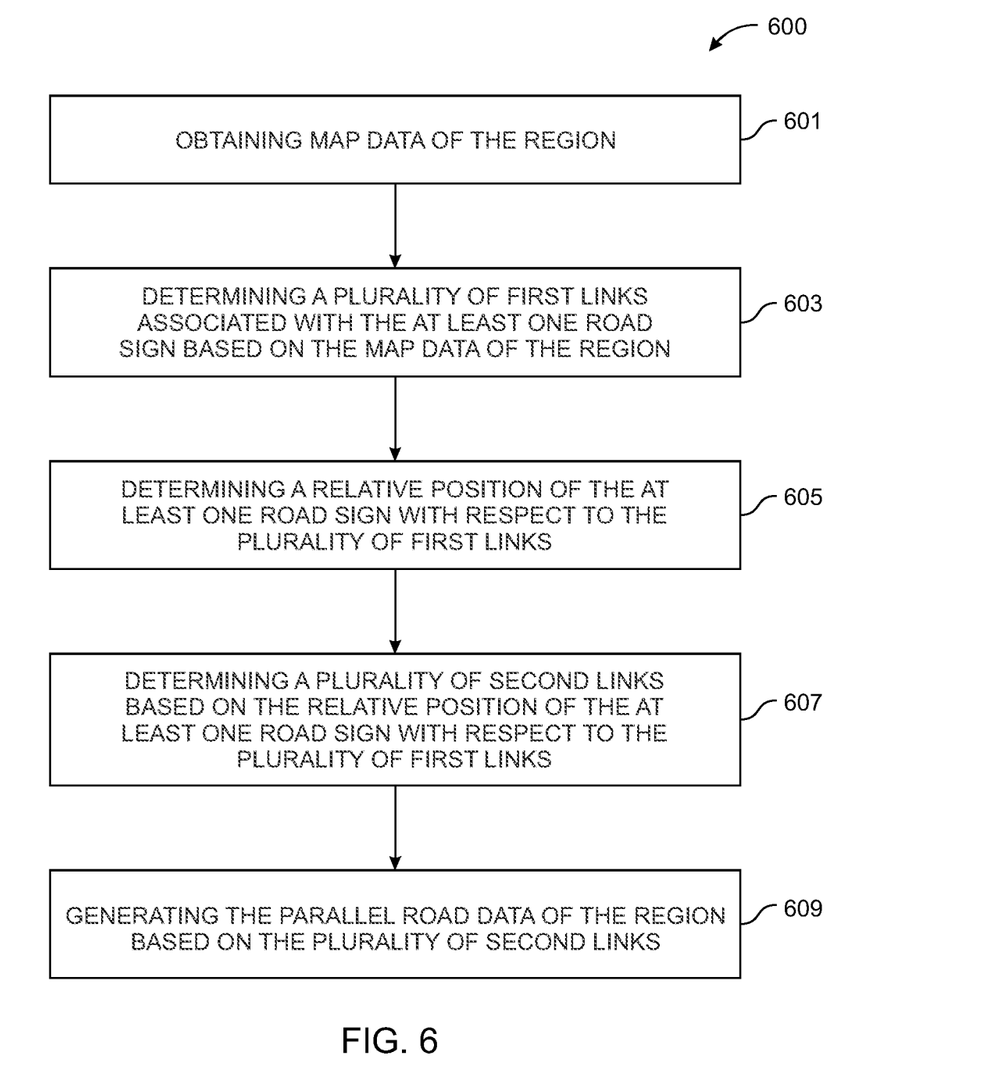
FIG. 6 illustrates a flow diagram of a method for generating parallel road data of a region, in accordance with an example embodiment.

FIG. 6 illustrates a flow diagram of a method 600 for generating parallel road data of a region, in accordance with an example embodiment. It will be understood that each block of the flow diagram of the method 600 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 600 illustrated by the flowchart diagram of FIG. 6 is for generating parallel road data of a region.

At step 601, the method comprises obtaining map data of the region. The map data may comprise at least one road sign, a plurality of links, shape point locations, heading values, and map-matched link of the at least one road sign in the region. The map data may provide one or more of a sign value, geo-location of the at least one road sign, map matched location of the at least one road sign, map-matched link of the at least one road sign, heading information of the at least one road sign, a link start node of the map-matched link, a link end node of the map-matched link, and the like.

At step 603, the method comprises determining a plurality of first links associated with the at least one road sign. A first plurality of shape point locations may be obtained from the map data. Thereafter, a second plurality of shape point locations may be obtained from the first plurality of shape point locations. The second plurality of shape location points satisfy a condition that these shape point locations are in a radial threshold distance from the road sign. The second plurality of shape location points are then filtered based on a heading criterion. The heading criterion comprises a condition that a heading difference between each of the second plurality of shape point locations and the road sign is less than a threshold value. Thereafter, the corresponding links of the second plurality of shape location points are selected as the plurality of first links.

At step 605, the method comprises determining a relative position of the road sign with respect to each of the plurality of first links. In a manner similar to that explained with reference to FIGS. 4A-4C, the relative position of the at least one road sign may be determined with respect to each of the plurality of first links, as one of "right above" or "on the side". An absolute distance between the relative position of the at least one road sign with respect to each of the plurality of first links and the respective one of the plurality of first links is determined. At step 607, the method comprises determining a plurality of second links from among the plurality of first links. For this, each link of the plurality of first links may be filtered based on the absolute distance of the at least one road sign from that particular link of the plurality of first links. Thus, the plurality of second links are the links that satisfy the absolute distance criterion described above. In other words, the plurality of second links are the links for which the absolute distance of the at least one road sign from them is within a threshold distance.

The method further comprises determining the map matched location and map matched heading of the at least one road sign. A refined location of the at least one road sign is also determined based on the map matched location and map matched heading of the at least one road sign. Additionally, a map matched location of each link of the plurality of second links may be determined and, in a manner, similar to that described previously with reference to FIG. 5A, a judgement value for a side of each of the plurality of second links with respect to the at least one road sign may be determined. At step 609, the method comprises generating the parallel road data of the region based on the plurality of second links. The parallel road data pf the at least one road sign may be generated in a format similar to the tabular format described with reference to FIG. 5B.

The method 600 may be implemented using corresponding circuitry. For example, the method 600 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 600.

In an example embodiment, an apparatus for performing the method 600 of FIG. 6 above may comprise a processor (e.g. the processor 201) configured to perform some or each of the operations of the method of FIG. 6 described previously. The processor may, for example, be configured to perform the operations (601-609) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-609) may comprise, for example, the processor 201 which may be implemented in the system 101 and/or a device or circuit for executing instructions or executing an algorithm for processing information as described above.

In this way, example embodiments of the invention result in generation of parallel road data of a region. The data of road signs may be supplemented with data of corresponding parallel roads associated with the road signs in a suitable data format. In this way, parallel road data of a region may be compiled using map data stored in a map database and the map database may be updated to reflect the parallel road data of each road sign. Thus, an end user device may be supplied with such an indication of the parallel road data so that appropriate correction techniques may be employed to counter the parallel road problem. Alternately, in some example embodiments, the mapping platform/database may itself apply suitable correction techniques to mitigate the parallel road problem. This way, when the parallel road problem is addressed, an end user may be provided with accurate and reliable navigation assistance. Therefore, embodiments of the present disclosure may provide improvements in the map database and/or the navigation assistance provided using such map data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for generating parallel road data of a region utilized when performing navigational routing functions, the system comprising:
a communications interface comprising an input interface and an output interface, the communications interface configured to obtain map data of the region over a network based on a request received via the input interface, wherein the map data comprises at least one road sign, and the map data is obtained from a geographic database, or the map data is based on information captured by user equipment;
a memory configured to store computer executable instructions; and
one or more processors in operable communication with the communications interface and the memory and configured to execute the instructions to:
determine a plurality of first links associated with the at least one road sign, based on the map data of the region;
determine a relative position of the at least one road sign with respect to each of the plurality of first links;
determine one or more second links, based on the relative position of the at least one road sign with respect to each of the plurality of first links;
generate the parallel road data of the region, based on the one or more second links; and
update the map data of the region in a map database, based on the generated parallel road data,
wherein the updated map data of the region from the map database is utilized by a navigation application on the output interface associated with the request, and
wherein the region includes at least the one or more first links and/or the one or more second links.

2. The system of claim 1, wherein the map data further comprises a first plurality of shape location points, and wherein to determine the plurality of first links, the one or more processors are further configured to obtain a second plurality of shape location points from the first plurality of shape location points, based on a radial distance threshold value.

3. The system of claim 2, wherein to obtain the plurality of first links, the one or more processors are further configured to filter each of the second plurality of shape location points, based on a heading criterion, and wherein the heading criterion comprises a condition that a heading difference between each of the second plurality of shape location points and the at least one road sign is less than a threshold heading value.

4. The system of claim 1, wherein to determine the one or more second links, the one or more processors are further configured to: determine an absolute distance between the relative position of the at least one road sign with respect to each of the plurality of first links; and filter each of the plurality of first links, based on the absolute distance between the relative position of the at least one road sign and the plurality of first links.

5. The system of claim 4, wherein to generate the parallel road data of the region, the one or more processors are further configured to: determine a map matched location of the at least one road sign and a map matched heading of the at least one road sign, based on the map data; and determine a refined location of the at least one road sign, based on the map-matched location of the at least one road sign and the map matched heading of the at least one road sign.

6. The system of claim 5, wherein to generate the parallel road data of the region, the one or more processors are further configured to: determine a map matched location of each of the one or more second links; and determine a judgement value for a side of each of the one or more second links with respect to the at least one road sign, based on the map-matched location of a respective one of the one or more second links and the refined location of the at least one road sign.

7. The system of claim 6, wherein the one or more processors are further configured to: determine the side of each of the one or more second links with respect to the at least one road sign, based on the judgement value; and generate the parallel road data of the region based on the determined side of each of the one or more second links with respect to the at least one road sign.

8. A method for generating parallel road data of a region utilized when performing navigational routing functions, the method comprising:
- obtaining map data of the region over a network, wherein the map data comprises at least one road sign, and the map data is obtained from a geographic database, or the map data is based on information captured by user equipment;
- determining a plurality of first links associated with the at least one road sign, based on the map data of the region;
- determining a relative position of the at least one road sign with respect to each of the plurality of first links;
- determining one or more second links, based on the relative position of the at least one road sign with respect to each of the plurality of first links;
- generating the parallel road data of the region, based on the one or more second links; and
- updating the map data of the region in a map database, based on the generated parallel road data,
  - wherein the updated map data of the region from the map database is utilized when performing navigational routing functions, and
  - wherein the region comprises at least one of the plurality of first links and/or the plurality of second links.

9. The method of claim 8, wherein the map data further comprises a first plurality of shape location points, and wherein determining the plurality of first links further comprises obtaining a second plurality of shape location points from the first plurality of shape location points, based on a radial distance threshold value.

10. The method of claim 9, wherein obtaining the plurality of first links further comprises filtering each of the second plurality of shape location points, based on a heading criterion, and wherein the heading criterion comprises a condition that a heading difference between each of the second plurality of shape location points and the at least one road sign is less than a threshold heading value.

11. The method of claim 8, wherein determining the one or more second links further comprises: determining an absolute distance between the relative position of the at least one road sign with respect to each of the plurality of first links; and filtering each of the plurality of first links, based on the absolute distance between the relative position of the at least one road sign and the plurality of first links.

12. The method of claim 11, wherein generating the parallel road data of the region further comprises: determining a map matched location of the at least one road sign and a map matched heading of the at least one road sign, based on the map data; and determining a refined location of the at least one road sign, based on the map-matched location of the at least one road sign and the map matched heading of the at least one road sign.

13. The method of claim 12, wherein generating the parallel road data of the region further comprises: determining a map matched location of each of the one or more second links; and determining a judgement value for a side of each of the one or more second links with respect to the at least one road sign, based on the map-matched location of a respective one of the one or more second links and the refined location of the at least one road sign.

14. The method of claim 13, further comprising: determining the side of each of the one or more second links with respect to the at least one road sign, based on the judgement value; and generating the parallel road data of the region based on the judgement value for a side of each of the one or more second links.

15. A computer programmable product comprising a non-transitory computer readable medium having stored thereon computer executable instruction which when executed by one or more processors, cause the one or more processors to carry out operations for generating parallel road data of a region utilized when performing navigational routing functions, the operations comprising:
- obtaining map data of the region over a network, wherein the map data comprises at least one road sign, and the map data is obtained from a geographic database, or the map data is based on information captured by user equipment;
- determining a plurality of first links associated with the at least one road sign, based on the map data of the region;
- determining a relative position of the at least one road sign with respect to each of the plurality of first links;
- determining one or more second links, based on the relative position of the at least one road sign with respect to each of the plurality of first links;
- generating the parallel road data of the region, based on the one or more second links; and
- updating the map data of the region in a map database, based on the generated parallel road data,
  - wherein the updated map data of the region from the map database is utilized when performing the navigational routing functions, and
  - wherein the region comprises at least one of the plurality of first links and/or the plurality of second links.

16. The computer program product of claim of claim 15, wherein the map data further comprises a first plurality of shape location points, and wherein for determining the plurality of first links, the operations further comprise obtaining a second plurality of shape location points from the first plurality of shape location points, based on a radial distance threshold value.

17. The computer program product of claim 16, wherein for obtaining the plurality of first links, the operations further comprise filtering each of the second plurality of shape location points, based on a heading criterion, and wherein the heading criterion comprises a condition that a heading difference between each of the second plurality of shape location points and the at least one road sign is less than a threshold heading value.

* * * * *